March 1, 1927.
C. B. NORRIS
1,619,305
MACHINE FOR CUTTING METAL SHEATHED SHEETS
Filed March 12, 1924     3 Sheets-Sheet 1
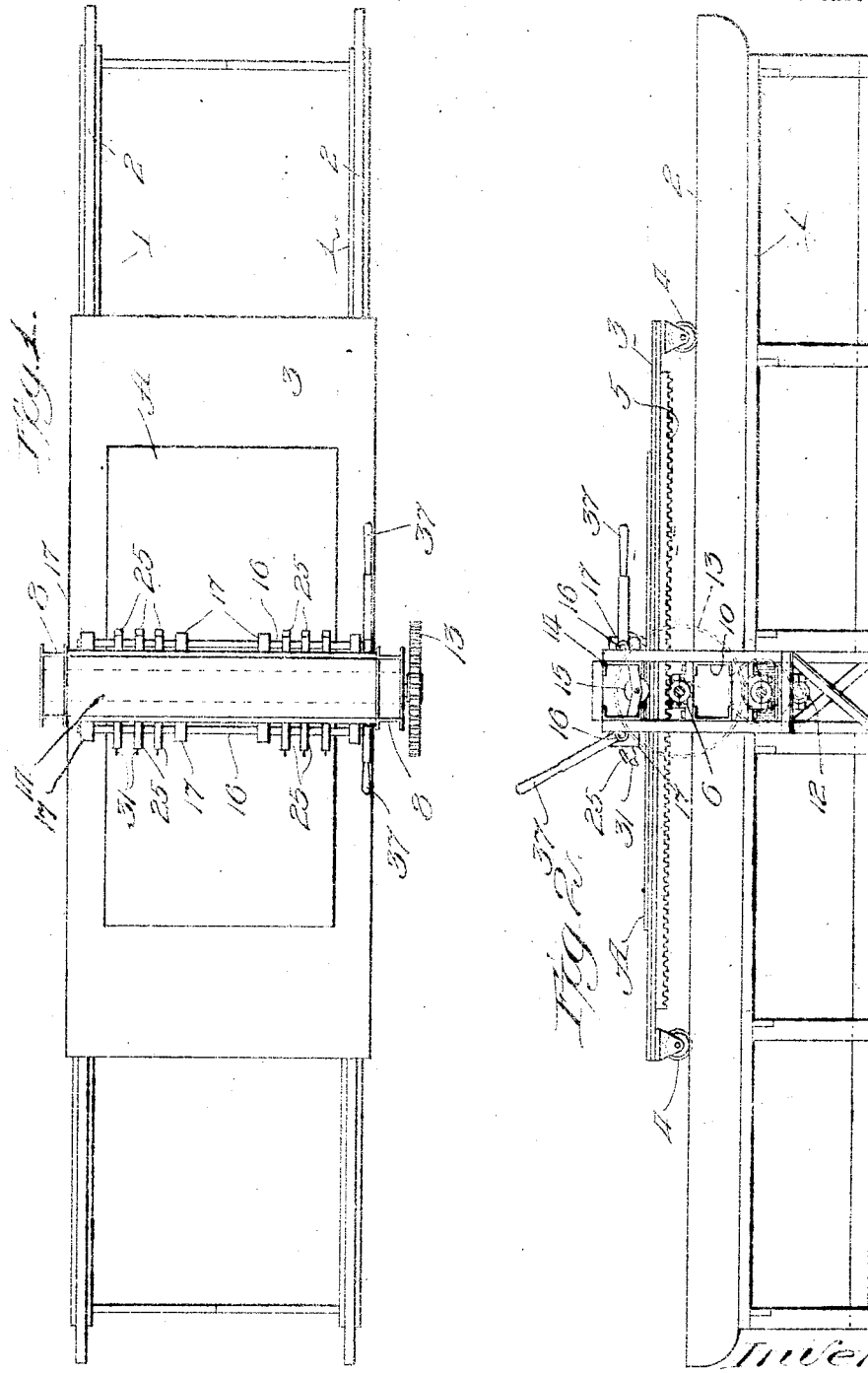

March 1, 1927.
C. B. NORRIS
1,619,305
MACHINE FOR CUTTING METAL SHEATHED SHEETS
Filed March 12, 1924   3 Sheets-Sheet 2
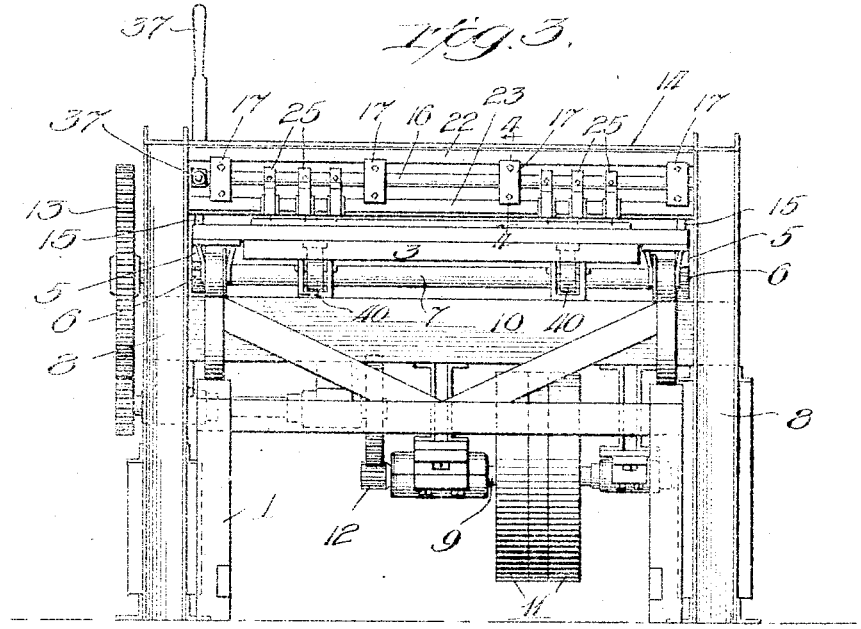
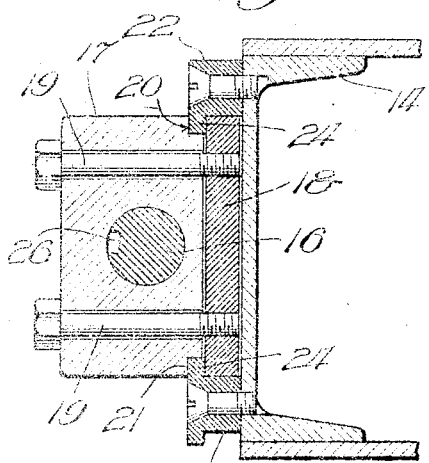
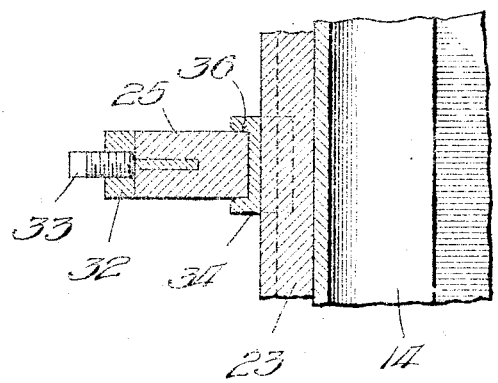
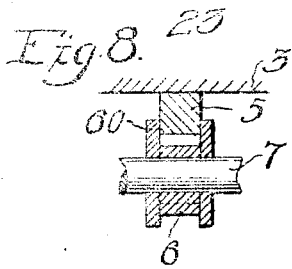
Inventor
Charles B. Norris
By Wm F Freudenreich Atty.

March 1, 1927. 1,619,305
C. B. NORRIS
MACHINE FOR CUTTING METAL SHEATHED SHEETS
Filed March 12, 1924   3 Sheets-Sheet 3
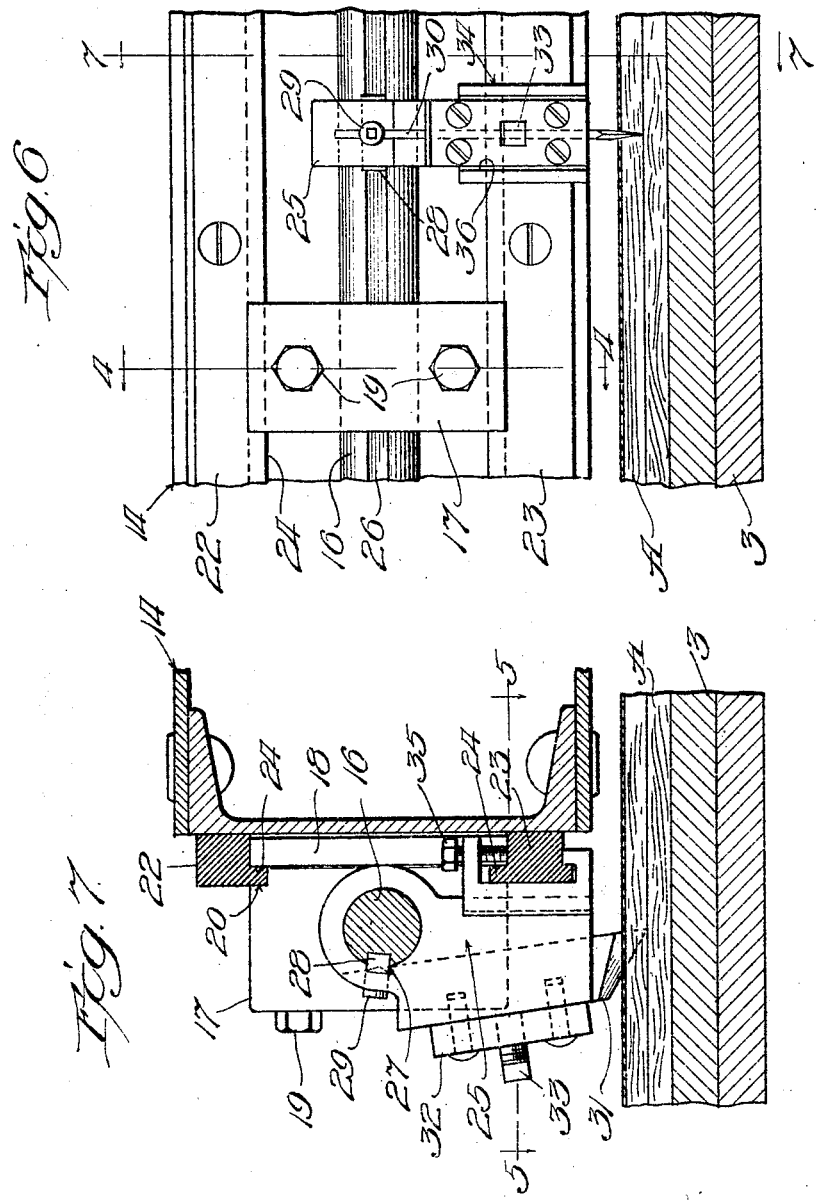

Patented Mar. 1, 1927.

1,619,305

UNITED STATES PATENT OFFICE.

CHARLES B. NORRIS, OF GRAND RAPIDS, MICHIGAN, ASSIGNOR TO HASKELITE MANUFACTURING CORPORATION, A CORPORATION OF NEW YORK.

MACHINE FOR CUTTING METAL-SHEATHED SHEETS.

Application filed March 12, 1924. Serial No. 698,640.

In the fabricating of panels of fibre, wood, or plywood, or of either of these materials sheathed with thin metal, it is desirable to provide means for cutting a panel simultaneously along a plurality of perfectly straight parallel lines. Such lines need not extend entirely through either or both of the opposed edges of a panel, as for example, in the case of a panel in which it is desired to form a door opening or the like.

The object of the present invention is to produce a simple and novel machine for quickly and accurately cutting into or through a panel along any desired number of parallel lines extending throughout any desired portion of the length or width of a panel and either through the edges or to any desired points remote from the edges.

The various features of novelty whereby my invention is characterized will hereinafter be pointed out with particularity in the claims; but for a full understanding of my invention and of its objects and advantages reference may be had to the following detailed description taken in connection with the accompanying drawings, wherein:

Figure 1 is a top plan view of a machine arranged in accordance with my invention; Fig. 2 is a side elevation of the machine;
Fig. 3 is an end view on a larger scale than Figs. 1 and 2; Fig. 4 is a section on a still larger scale taken approximately on line 4—4 of either Fig. 3 or Fig. 6; Fig. 5 is a section taken approximately on line 5—5 of Fig. 7; Fig. 6 is and end view of a fragment of the machine on a larger scale, the scale being the same as that of Figs. 4 and 5, the table and the work thereon being shown in section; Fig. 7 is a section taken on line 7—7 of Fig. 6; and Fig. 8 is a sectional view illustrating a detail of the driving means for the table.

Referring to the drawings, 1 represents a long base or frame having on the top thereof two parallel rails 2, 2 extending lengthwise thereof, the rails being at opposite sides of the frame. Mounted on these rails is a traveling table 3, conveniently supported by means of wheels 4, resting on the rails. If the rails are made accurately parallel with each other and the wheels 4 are flanged, as shown, the flanges and the rails will cooperate to prevent sidewise motion of the table. On the under side of the table are two long rack bars 5, one near each side of the table. Meshing with these rack bars are pinions 6, 6 fixed upon a transverse shaft 7, extending across the frame underneath the table. This shaft is journaled in standards or pedestals 8, rising upwardly at opposite sides of the frame about midway between the ends of the latter. The shaft 7 may be driven in any suitable way as long as it is adapted to rotate first in one direction and then in the other so as to cause the table to reciprocate. In the arrangement shown, there is a driving shaft 9 hung in bearings depending from a heavy cross-beam 10, located below the shaft 7 and forming part of the main frame, the cross-beam being connected at its ends to the pedestals. On the shaft 9 is a double pulley device 11, which, through the use of a straight and a crossed belt, permits the shaft to be driven in either direction. A train of gearing, beginning with a pinion 12 on the driving shaft 9, and ending in a large gear wheel 13, on the shaft 7, serves to transmit the motion of the shaft 9 to the other shaft.

The upper ends of the pedestals are bound together by a transverse box girder 14, which is preferably provided with rollers 15, engaging with the top of the table above the driving pinions 6, to hold the same down. On the front and rear sides of the cross member 14, are supported rock shafts 16, 16 on which cutting elements are mounted. These rock shafts should be supported not only at their ends but also at intermediate points in order to prevent them from being sprung during the cutting operation and thus preventing the cutting from being accurately done. Since it is desirable to be able to make cuts along any longitudinal line on the table, it is advisable that the bearing for the rock shafts be adjustable transversely of the table in order that they will not interfere with the proper positioning of the cutting elements. The rock shafts may be and preferably are alike and interchangeable and therefore only one need be described. In the arrangement shown each rock shaft has four bearings. Each bearing comprises a block 17, behind which lies a plate 18, fastened thereto by means of studs 19, extending through the block from the front of the latter. Each block has its rear or inner end reduced in vertical thickness so as to form wth the corresponding plate a pair of transverse grooves 20, extending across the same on the upper and underside respectively. The bearing blocks with their plates fits slidably between transverse guides 22, 23 fixed to the corresponding side or face of the transverse beam 14, each guide having a lip 24, fitting into one of the grooves in the block; the lips being slightly thicker than the widths of the grooves measured in the direction of the length of the table so that when the studs are tightened the lips are clamped between the plate 18 and the block rigidly to attach the bearing block to the guides. When one of the bearings is to be shifted, the studs are simply loosened and the bearing may then be slid along the guides to its new position.

The cutting elements may be of any usual or suitable type or types. In the arrangement shown, they take the form of knives fixed to the rock shafts and adapted to remain stationary while the table is carrying the work past them. The cutting elements must be adjustable lengthwise of the rock shafts if the machine is to be adapted to cut along any desired lines running lengthwise of the table. In the arrangement shown, each blade holder consists of a block 25, bored at one end to receive the corresponding rock shaft and cause the block to be a sliding fit on the shaft. Each rock shaft has a keyway 26, extending lengthwise of the same. Each block has a keyway 27, registering with that in the corresponding shaft. A short key 28, fits into the registering keyways so as to lock the block against turning movement on the shaft, while permitting the block to be slid along the shaft. A set screw 29, passes through the block into engagement with the key. When the set screw is tightened, it locks the holding block to the shaft and keeps it from being displaced from any position into which it may have been adjusted. Each blade holder has in the outer side a deep central slot 30, arranged at right angles to the shaft, into which a cutting blade 31, is adapted to fit. The blade is held in place by means of a plate 32, extending across the slot and detachably secured to the holding block. The parts are preferably so proportioned that the blade may be moved lengthwise of its seat in the holder, even when the plate 32, in position; a set screw 33, carried by the plate being provided in a position to engage with the edge of the body portion of the blade to clamp it in a fixed position. With this arrangement only a single screw need be loosened in order to permit the blade to be adjusted in its holder.

It is desirable that the supports for the blades be very rigid. The means, heretofore described for mounting the rock shafts, insures rigidity in the vertical direction. In order to insure rigidity in a direction transverse to the table, I have provided means adapted to engage with the lower ends of the blade holders, when the holders are swung down into a working position as shown in Figs. 5, 6 and 7, and interlock the holders with the rigid frame work. To this end, I have mounted on each of the lower rails or guides 23, a series of heads 34, that may be slid lengthwise of these guides or be rigidly fastened thereto in any positions into which they may be brought, by means of set screws 35 or other suitable holding means. Each of these heads has in its outer face a vertical channel 36 just wide enough to receive and embrace the inner edge of one of the blade holders when the latter is swung into its working position. By this means, each blade holder may be firmly held against chattering in the direction transverse to the table while a cutting operation is being performed.

Each rock shaft is provided with a radial handle 37, by means of which it may be swung from an idle position, as indicated on the left hand side of Figs. 1 and 2, into a working position such as indicated on the right hand side of Figs. 1 and 2 and also in Figs. 5, 6 and 7.

In using the machine, a panel to be cut is placed on the table, the panel as a whole being indicated at A in the drawings. As many knives as there are cuts to be made along parallel lines are properly adjusted on one of the rock shafts. If the cuts are to extend through one edge of the panel, the table and the work may initially be so positioned that when the rock shaft with its knives is swung into its working position, the knives will not engage with the panel until the panel is moved into them by the table; the table being then caused to travel until the ends of the cuts to be made have been reached. In the event that the cuts are to begin within an end edge of the panel, the work is so positioned, before the rock shaft is swung into its working position, that the knives will strike the work at the points where the cuts are to begin, when the rock shaft is brought into its working position. It will be seen that it is unnecessary initially to force the knives into the work as far as they will go, by the manual operation of the rock shaft, because the work will complete the downward swinging movement of the knives as the work advances underneath the same. In other words, the work, as viewed in Fig. 7, travels from left to right while the knives carried by the rock shaft there illustrated are doing the cutting. The knives may be set to cut parts through the work or entirely through the same. Furthermore, one set of knives may be set to make a partial cut as the table travels in one direction, the other set of knives entering these partially completed cuts and completing them during the return movement of the table. Furthermore, panels that are short enough may be turned on the table through any desired angle, so as to permit them to be cut along two sets of lines at an angle to each other. Thus, for example, a square or rectangular piece may be cut out of the body of a panel. Many other ways of using the machine will suggest themselves.

In order that the table need not be made unduly heavy in order to afford the desired rigidity of support to the panel, supporting rollers 40, or other anti-friction devices may be arranged beneath the table directly below the transverse lines on which the knives are located; these additional supporting devices resisting any tendency of the table to be deflected outwardly.

Although the table may be held against lateral movement by cooperation of flanged wheels with the supporting rails, a simpler expedient is to act on the table in the zone underlying the cutting elements where the need for extreme accuracy is greatest. This may conveniently be accomplished, as shown in Fig. 8, by providing one of the pinions 6 with flanges 60, engaging with the sides of the rack bar 5. Therefore, if the rack bar is machined so as to be perfectly straight, the lines on which the cuts are made will also be perfectly straight. Both expedients may of course be employed in order to prevent one end of the table from being accidentally pushed sidewise, particularly when the other end is under the cutters.

It will thus be seen that I have produced a simple and novel machine which, although comparatively light, possesses great rigidity so that sheets or panels may be cut accurately and rapidly along any desired number of lines of any desired length.

While I have illustrated and described with particularity only a single preferred form of my invention, I do not wish to limit myself to the details so illustrated and described; but intend to cover all forms and arrangements that come within the definitions of my invention constituting the appended claims.

I claim:

1. In a machine of the character described, a table, a member extending across the table at some distance above the same, rock shafts on opposite sides of said member extending across said table and parallel therewith, the rock shafts being arranged to rock independently of each other, cutting elements on said shafts constructed and arranged to be movable between working and idle positions by the rocking of said shafts, and means for producing relative movements between said table and said member.

2. In a machine of the character described, a table, a member extending across the table at some distance above the same, means for producing relative reciprocating movements between said member and the table in the direction of the length of the latter, and groups of cutting elements mounted on opposite sides of said member so as to be movable independently of each other between working positions and idle positions.

3. In a machine of the character described, a reciprocable table, two parallel rock shafts extending across and parallel with the table and movable independently of each other, and cutting elements mounted on said shafts and adapted to be moved from and toward the table when said shafts are rocked.

4. In a machine of the character described, a table, a member extending across the table at some distance above the same, a rock shaft mounted on said member parallel with said table, holders for cutting elements secured to said rock shaft, and said member having jaws positioned to receive the lower ends of the holders and support the holders against movement laterally of the table when the rock shaft is moved to place the holders in a cutting position.

5. In a machine of the character described, a table, a member extending across the table at some distance above the same, a rock shaft extending along said member at the side thereof, bearings for said rock shaft mounted on said member so as to be adjustable lengthwise of the shaft, and holders for cutting elements mounted on said shaft so as to be adjustable along the latter.

6. In a machine of the character described, a table, a member extending across the table at some distance above the same, a rock shaft extending along said member at the side thereof, bearings for said rock shaft mounted on said member so as to be adjustable lengthwise of the shaft, holders for cutting elements mounted on said shaft so as to be adjustable along the latter, and devices mounted on said member below said shaft so as to be adjustable lengthwise of the shaft, said devices having seats to engage with said holders in one position of the shaft and prevent the holders from being displaced in the lateral direction.

7. A machine of the character described, comprising a table, a member arranged above and spaced apart from the table, means for producing relative movements between said member and the table, guides on said member parallel with the table, bearings supported by said guides and adjustable along the same, a rock shaft mounted in said bearings, and holders for cutting elements mounted on said shaft so as to project radially therefrom and be adjustable along the same.

8. A machine of the character described, comprising a table, a member arranged above and spaced apart from the table, means for producing relative movements between said member and the table, guides on said member parallel with the table, bearings supported by said guides and adjustable along the same, a rock shaft mounted in said bearings, holders for cutting elements mounted on said shaft so as to project radially therefrom and be adjustable along the same, and devices mounted on one of said guides and adjustable along the same for engaging the holders when the latter are swung into their working positions and steadying them.

9. A machine of the character described, comprising a base having long parallel tracks on the upper side, a table having rollers resting on said tracks, standards rising from said base above the table, a rigid cross beam connecting the upper ends of said standards together, means for moving said table back and forth along said tracks, two rock shafts extending along said beam on opposite sides thereof, and holders for cutting elements mounted on said rock shaft.

10. A machine of the character described, comprising a base having long parallel tracks on the upper side, a table having rollers resting on said tracks, standards rising from said base above the table, a rigid cross beam connecting the upper ends of said standards together, means for moving said table back and forth along said tracks, two rock shafts extending along said beam on opposite sides thereof, holders for cutting elements mounted on said rock shaft, a rigid beam extending across the base below the upper beam and below said table, and antifriction supports for the table on the beam below the same.

11. A machine of the character described, comprising a frame, a table supported by and movable along said base, cutting elements supported by the frame and extending across the table above the latter, a rack bar extending lengthwise of the table, a toothed driving wheel engaged with said rack bar at about the vertical plane containing the cutting elements, and flanges on said wheel engaging with the sides of the rack bar to hold the table against lateral movement in the cutting zone.

In testimony whereof, I sign this specification.

CHARLES B. NORRIS.